United States Patent
Kodama et al.

(10) Patent No.: US 11,150,163 B2
(45) Date of Patent: Oct. 19, 2021

(54) ACCELERATOR PLAY MEASUREMENT DEVICE, ACCELERATOR PLAY MEASUREMENT METHOD, PROGRAM, AND MEDIUM

(71) Applicant: MEIDENSHA CORPORATION, Tokyo (JP)

(72) Inventors: Akihiko Kodama, Tokyo (JP); Kenji Watanabe, Tokyo (JP); Tsuyoshi Shimizu, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/261,508

(22) PCT Filed: Mar. 13, 2019

(86) PCT No.: PCT/JP2019/010257
§ 371 (c)(1),
(2) Date: Jan. 19, 2021

(87) PCT Pub. No.: WO2020/017095
PCT Pub. Date: Jan. 23, 2020

(65) Prior Publication Data
US 2021/0247272 A1 Aug. 12, 2021

(30) Foreign Application Priority Data

Jul. 20, 2018 (JP) .............................. JP2018-137100

(51) Int. Cl.
| | | |
|---|---|---|
| *G01M 17/007* | (2006.01) | |
| *G05G 1/38* | (2008.04) | |
| *F16H 59/08* | (2006.01) | |
| *B60K 26/02* | (2006.01) | |

(Continued)

(52) U.S. Cl.
CPC ........... *G01M 17/007* (2013.01); *B60K 26/02* (2013.01); *F02D 11/06* (2013.01); *F16H 59/08* (2013.01);
(Continued)

(58) Field of Classification Search
CPC ...... G01M 17/007; F16H 61/02; F16H 63/50; F16H 59/08; F02D 11/06; B60K 26/02; G05G 1/38
See application file for complete search history.

(56) References Cited

U.S. PATENT DOCUMENTS

| | | | |
|---|---|---|---|
| 5,514,049 A | 5/1996 | Kamio et al. | |
| 2003/0230153 A1* | 12/2003 | McVicar | ................ B60T 7/042 73/865.5 |

(Continued)

FOREIGN PATENT DOCUMENTS

| | | |
|---|---|---|
| JP | H06-002581 A | 1/1994 |
| JP | H06-102147 A | 4/1994 |

(Continued)

*Primary Examiner* — Behrang Badii
*Assistant Examiner* — Daniel L Greene
(74) *Attorney, Agent, or Firm* — Muncy, Geissler, Olds & Lowe, P.C.

(57) ABSTRACT

This accelerator play measurement device measures the play opening of an accelerator pedal of a vehicle, and includes: an accelerator actuator for operating the accelerator pedal; a vehicle speed sensor for detecting the vehicle speed of the vehicle; a first measurement unit for calculating a provisional play opening on the basis of a change in vehicle speed detection value from the vehicle speed sensor when the accelerator actuator has been driven and the accelerator pedal opening degree has been increased at a first speed from a fully-closed opening degree; and a second measurement unit for detecting the play opening on the basis of a change in vehicle speed detection value when the accelerator actuator has been driven and the accelerator pedal opening degree (Continued)

has been increased at a second speed higher than the first speed from the fully-closed opening degree to close to the provisional play opening.

20 Claims, 5 Drawing Sheets

(51) Int. Cl.
  *F02D 11/06* (2006.01)
  *F16H 63/50* (2006.01)
  *F16H 61/02* (2006.01)
(52) U.S. Cl.
  CPC .............. *F16H 61/02* (2013.01); *F16H 63/50* (2013.01); *G05G 1/38* (2013.01)

(56) References Cited

U.S. PATENT DOCUMENTS

| | | |
|---|---|---|
| 2004/0011155 A1 | 1/2004 | Kumamoto et al. |
| 2004/0099085 A1* | 5/2004 | Olofsson ......... B60W 30/18181 74/513 |
| 2004/0167699 A1* | 8/2004 | Klotzbuecher ... B60W 50/0098 701/70 |
| 2011/0106381 A1* | 5/2011 | Filev .................... B60W 50/08 701/40 |
| 2013/0211686 A1* | 8/2013 | Shono ............. B60W 30/18072 701/70 |
| 2014/0180554 A1* | 6/2014 | Takahashi ............. B60W 40/10 701/70 |
| 2015/0136092 A1 | 5/2015 | Sakayangi |
| 2016/0221437 A1* | 8/2016 | Takegawa .......... B60W 50/082 |
| 2016/0258364 A1* | 9/2016 | Takeyoshi ............... F02D 11/02 |
| 2019/0112997 A1* | 4/2019 | Suesada ................ F02D 41/403 |

FOREIGN PATENT DOCUMENTS

| | | |
|---|---|---|
| JP | 2002-114053 A | 4/2002 |
| JP | 2003-098048 A | 4/2003 |
| WO | WO-2014/013590 A1 | 1/2014 |

* cited by examiner

ACCELERATOR PLAY MEASUREMENT DEVICE, ACCELERATOR PLAY MEASUREMENT METHOD, PROGRAM, AND MEDIUM

TECHNICAL FIELD

The present invention relates to an accelerator play measurement device for measuring the play opening degree of the accelerator pedal of a vehicle, an accelerator play measurement method, a program, and a medium.

BACKGROUND ART

Vehicle testing such as durability testing, exhaust purification performance evaluation testing and fuel economy measurement testing are performed by causing an actual vehicle to run on the roller of a chassis dynamometer, for example. At this time, the driving of the actual vehicle is often performed by an automatic driving device (so-called drive robot). When a speed command corresponding to the speed of the vehicle to be realized is inputted, the drive robot drives an actuator that operates the accelerator pedal and/or brake pedal of the vehicle, so as to realize this speed command. The driving of the vehicle according to a speed command set in advance is called mode driving.

In vehicle testing, the durability performance, exhaust purification performance, fuel economy, etc. of the vehicle are evaluated as a results of the mode driving performed by the drive robot replacing a person. Therefore, it is required for the drive robot used in such testing to be loyal to vehicle speed commands.

However, while little, play is provided in the accelerator pedal of actual vehicles. For this reason, with the control device of a drive robot, it becomes possible to set the play opening degree of the accelerator pedal for every vehicle which is the testing target, so as to be able to operate the accelerator pedal loyally to the speed command. For this reason, upon performing testing using a drive robot, it is necessary to measure the play opening degree of the accelerator pedal beforehand. For example, with the technology shown in Patent Document 1, upon gradually depressing the accelerator pedal, the play opening degree is calculated based on the opening degree of the accelerator pedal when the engine revolution speed starts to rise from the idle revolution speed.

Patent Document 1: Japanese Unexamined Patent Application, Publication No. 2003-98048

DISCLOSURE OF THE INVENTION

Problems to be Solved by the Invention

In this way, with the technology of Patent Document 1, the play opening degree of the accelerator pedal is measured using the change in engine revolution speed. For example, in the case of establishing an electric vehicle or hybrid vehicle which cannot acquire an engine revolution speed or is capable of traveling by a motor even if the engine is stopped, it has been difficult to measure the play opening degree of the accelerator pedal by adopting the technology of Patent Document 1.

The present invention has an object of providing an accelerator play measurement device, accelerator play measurement method, program and medium which can measure the play opening degree of the accelerator pedal of a vehicle without using engine revolution speed.

Means for Solving the Problems

An acceleration play measurement device according to a first aspect of the present invention is a device for measuring a play opening degree of an accelerator pedal of a vehicle, the accelerator play measurement device including: an accelerator actuator which operates the accelerator pedal; a vehicle speed sensor which detects vehicle speed of the vehicle; a first measurement unit which calculates a provisional play opening degree based on a change in a vehicle speed detection value from the vehicle speed sensor at a time when increasing the accelerator pedal opening degree at a first speed from a full-closed opening degree by way of driving the accelerator actuator; and a second measurement unit which calculates the play opening degree based on a change in the vehicle speed detection value at a time when increasing the accelerator pedal opening degree at a second speed which is faster than the first speed to a vicinity of the provisional play opening degree, by way of driving the accelerator actuator. It should be noted that, hereinafter, fully-closed opening degree is an opening degree of the accelerator pedal in a state not depressing the accelerator pedal, and full-open opening degree shall be an opening degree of the accelerator pedal in a state depressing the accelerator pedal.

According to a second aspect of the present invention, in this case, it is preferable for the first measurement unit to determine whether the vehicle speed detection value has increased while increasing the accelerator pedal opening degree at the first speed from a full-closed opening degree, and calculate the provisional play opening degree based on the accelerator pedal opening degree of a time when determined that the vehicle speed detection value increased; and the second measurement unit to include: an accelerator control section which executes, for a plurality of times, accelerator control to cause the accelerator pedal opening degree to increase at the second speed towards a predetermined target opening degree by driving the accelerator actuator, and determine existence of an increase in the vehicle speed detection value, while degreasing or increasing the target opening degree from the provisional play opening degree; and a play opening degree calculation section which calculates the play opening degree based on the target opening degree at a time when an increase in the vehicle speed detection value first was no longer detected, or at a time when an increase in the vehicle speed detection value was first detected, by the accelerator control unit.

According to a third aspect of the present invention, in this case, it is preferable for the first measurement unit to calculate, as the provisional play opening degree, an opening degree which is larger by a predetermined opening degree than the accelerator pedal opening degree of a time when determined that the vehicle speed detection value increased; the accelerator control unit to execute the accelerator control for a plurality of times while decreasing the target opening degree from the provisional play opening degree; and the play opening degree calculation section to calculate the play opening degree based on the target opening degree of a time when an increase in the vehicle speed detection value was first no longer detected by the accelerator control unit.

According to a fourth aspect of the present invention, in this case, it is preferable for the first measurement unit to calculate, as the provisional play opening degree, an opening degree which is smaller by a predetermined opening degree than the accelerator pedal opening degree of a time when determined that the vehicle speed detection value increased; the accelerator control unit to execute the accelerator control for a plurality of times while increasing the target opening degree from the provisional play opening degree; and the play opening degree calculation section to calculate the play opening degree based on the target opening degree of a time when an increase in the vehicle speed detection value was first detected by the accelerator control unit.

According to a fifth aspect of the present invention, in this case, it is preferable for the accelerator control unit to cause the accelerator pedal opening degree to increase towards the target opening degree at the second speed which is faster than the first speed by causing the accelerator pedal opening degree to change step-wise in the accelerator control.

According to a sixth aspect of the present invention, in this case, it is preferable for the accelerator play measurement device to further include a shift actuator which operates a shift lever of the vehicle, in which the first measurement unit sets a position of the shift lever to a drive position by driving the shift actuator, and after the vehicle speed detection value becomes stable, starts driving of the accelerator actuator.

According to a seventh aspect of the present invention, in this case, it is preferable for the first measurement unit to: cause the accelerator pedal opening degree to increase from a full-closed opening degree by driving the accelerator actuator, after setting the position of the shift lever to the drive position, and if the vehicle speed detection value increases, return the accelerator pedal opening degree to the full-closed opening degree; and subsequently calculate the provisional play opening degree by driving the accelerator actuator, after the vehicle speed detection value becomes stable.

An accelerator play measurement method according to an eighth aspect of the present invention is a method executed by the accelerator play measurement device as described in the first aspect, the method including: a provisional play opening degree measurement step of the first measurement unit calculating a provisional play opening degree based on a change in the vehicle speed detection value from the vehicle speed sensor at a time when increasing the accelerator pedal opening degree at a first speed from a full-closed opening degree, by way of driving the accelerator actuator; and a play opening degree measurement step of the second measurement unit calculating the play opening degree based on a change in the vehicle speed detection value at a time when increasing the accelerator pedal opening degree at a second speed which is faster than the first speed towards a vicinity of the provisional play opening degree, by way of driving the accelerator actuator.

A program according to a ninth aspect of the present invention is characterized by causing a computer to execute each step of the accelerator play measurement method as described in the eighth aspect.

A method according to a tenth aspect of the present invention is characterized by encoded the program as described in the ninth aspect.

Effects of the Invention (1) A delay exists in the response of the vehicle to operation of the accelerator pedal. For this reason, by simply measuring the play opening degree based on a change in the vehicle speed detection value at the time when increasing the accelerator pedal at a predetermined speed from a full-closed opening degree, a shift arises in the measurement results of the play opening degree by an amount according to the speed of changing the accelerator pedal opening degree and the above-mentioned response delay. For this reason, although it has been considered to measure the play opening degree based on the change in vehicle speed detection value at the time when changing the accelerator pedal opening degree as slowly as possible, in this case, it takes a long time in measurement. Therefore, with the accelerator play measurement device of the present invention, the first measurement unit first calculates the provisional play opening degree corresponding to a provisional value for the play opening degree based on a change in the vehicle speed detection value at the time when increasing the accelerator pedal opening degree at a first speed from the full-closed opening degree; and the second measurement unit calculates the play opening degree based on a change in the vehicle speed detection value at the time when increasing the accelerator pedal opening degree at a second speed faster than the first speed to a vicinity of the provisional play opening degree from the full-closed opening degree. It is thereby possible to measure the play opening degree of the accelerator pedal precisely in a short time. In addition, with a vehicle equipped with an engine as the power generation source, there exists a component which varies the operation amount of the throttle valve according to the speed of depressing the accelerator pedal. In contrast, with the present invention, after calculating the provisional play opening degree under the first speed in the first measurement unit, since it is possible to sharpen the reaction of the engine, and consequently the vehicle speed, relative to operation of the accelerator pedal more than the measurement of the first measurement unit, with the measurement of the second measurement unit by measuring the play opening degree in the vicinity of the provisional play opening degree under the second speed which is faster than the first speed in the second measurement unit, the play opening degree can be measured more precisely.

(2) With the accelerator play measurement device of the present invention, the first measurement unit first determines whether or not the vehicle speed detection value has increased while increasing the accelerator pedal opening degree at the first speed from the full-closed opening degree, and calculates the provisional play opening degree based on the opening degree of the accelerator pedal at the time when determined that the vehicle speed detection value increased. Herein, opening degree of the accelerator pedal at the time when determined that the vehicle speed detection value increased by the first measurement unit is considered to be close to the opening degree at which the power generation source such as the engine or drive motor equipped to the vehicle first reacts to operation of the accelerator pedal, i.e. true play opening degree; however, a shift arises by an amount according to the first speed due to a reaction delay existing as mentioned above. The first measurement unit calculates the provisional play opening degree in the vicinity of the true play opening degree in this way. In addition, the accelerator control unit executes accelerator control to cause the accelerator pedal opening degree to increase at the second speed to a predetermined opening degree and determines the existence of an increase in the vehicle speed detection value a plurality of times, while causing this target opening degree to decrease or increase from the provisional play opening degree, and the play opening degree calculation section calculates the play opening degree based on the target opening degree at the time when an increase in the vehicle speed detection value was first no longer detected, or the time when an increase in the vehicle speed detection value was first detected by the accelerator control unit. In the above way, the accelerator play measurement device of the present invention calculates the provisional play opening degree in the vicinity of the true play opening degree by causing the accelerator pedal opening degree to change at the first speed, and subsequently calculates the play opening degree in the vicinity of this provisional play opening degree, by executing accelerator control for a plurality of times while causing the target opening degree to change from the provisional play opening degree to an increasing side or decreasing side. It is thereby possible to measure the play opening degree of the accelerator pedal precisely in a short time.

(3) The first measurement unit calculates, as the provisional play opening degree, an opening degree which is larger by a predetermined opening degree than the accelerator pedal opening degree of the time when determined that the vehicle speed detection value increased. The provisional play opening degree is thereby set to an opening degree somewhat larger than the true play opening degree. Then, the accelerator control unit executes the accelerator control a plurality of times while decreasing the target opening degree from the provisional play opening degree, i.e. while bringing the target opening degree to the true play opening degree, and the play opening degree calculation section calculates the play opening degree based on the target opening degree at the time when an increase in the vehicle speed detection value was first no longer detected. It is thereby possible to measure the play opening degree of the accelerator pedal precisely in a short time.

(4) The first measurement unit calculates, as the provisional play opening degree, an opening degree which is smaller by a predetermined opening degree than the accelerator pedal opening degree of the time when determined that the vehicle speed detection value increased. The provisional play opening degree is thereby set to an opening degree somewhat smaller than the true play opening degree. Then, the accelerator control unit executes the accelerator control a plurality of times while increasing the target opening degree from the provisional play opening degree, i.e. while bringing the target opening degree to the true play opening degree, and the play opening degree calculation section calculates the play opening degree based on the target opening degree of the time when an increase in the vehicle speed detection value was first detected. It is thereby possible to measure the play opening degree of the accelerator pedal precisely in a short time.

(5) The accelerator control unit causes the accelerator pedal opening degree to increase towards the target opening degree at a second speed which is faster than the first speed, by causing the accelerator pedal opening degree to change step-wise in the accelerator control. Since it is thereby possible to shorten the time required in execution of accelerator control, the play opening degree of the accelerator pedal can be precisely measured in a shorter time.

(6) It is difficult to measure whether or not the vehicle speed detection value has changed by causing the accelerator pedal opening degree to increase, in a state in which the vehicle speed detection value is unstable immediately after setting the position of the shift lever to the drive position. Therefore, the first measurement unit first sets the position of the shift lever to the drive position by driving the shift actuator, starts driving of the accelerator actuator after the vehicle speed detection value becomes stable, and then sets the provisional play opening degree as described above. Since it is thereby possible to set the provisional play opening degree to the vicinity of the true play opening degree, the time required in measurement of the play opening degree can be shortened.

(7) With the present invention as mentioned above, the provisional play opening degree is first calculated in the first measurement unit by driving the accelerator actuator; however, since the state of the vehicle immediately after startup is unstable, this provisional play opening degree calculated by the first measurement unit may differ every time. Therefore, the first measurement unit, after setting the position of the shift lever to the drive position, causes the accelerator pedal opening degree to increase from the full-closed opening degree, and if the vehicle speed detection value increases, returns the accelerator pedal opening degree to the full-closed opening degree, and subsequently, after the vehicle speed detection value becomes stable, calculates the provisional play opening degree by driving the accelerator actuator again. In other words, with the present invention, before calculating the provisional play opening degree in the first measurement unit, the accelerator pedal opening degree is tentatively made to increase until the vehicle speed detection value increases. Since it is thereby possible to stabilize the state of the vehicle prior to causing the accelerator pedal opening degree to increase in order to calculate the provisional play opening degree, the provisional play opening degree can be precisely calculated.

PREFERRED MODE FOR CARRYING OUT THE INVENTION

Figure 1:
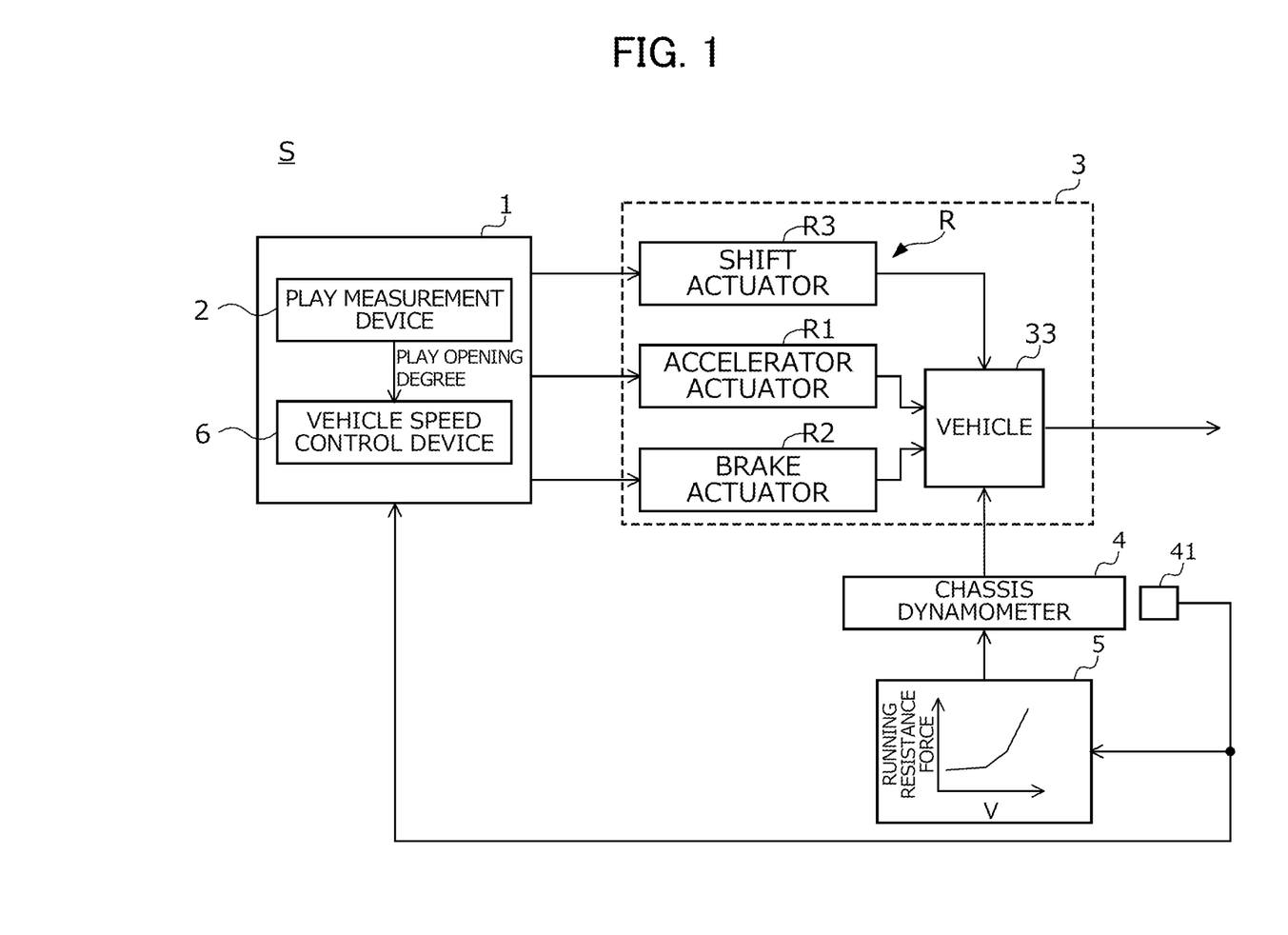
FIG. 1 is a view showing the configuration of a control system of a vehicle testing system to which the accelerator play measurement device and accelerator play measurement method according to an embodiment of the present invention are applied.

Hereinafter, an embodiment of the present invention will be explained while referencing the drawings. FIG. 1 is a view showing the configuration of a control system of a vehicle testing system S to which the accelerator play measurement device and accelerator play measurement method according to the present embodiment are applied. The vehicle testing system S includes a control target 3 containing a drive robot R, a robot control device 1 thereof, a chassis dynamometer 4, and a running resistance force control device 5.

The control target 3 includes a vehicle 33 serving as the testing target, and a drive robot R equipped to the driver seat of this vehicle.

The vehicle 33 is a so-called hybrid vehicle including an engine and drive motor as power generation sources; however, the present invention is not limited thereto. The vehicle 33 may be one equipped with only an engine as the power generation source, or may be equipped only with a drive motor as the power generation source. In addition, although a case will be explained hereinafter in which the transmission that gear reduces the driving power generated by the power generation source and transmits to the drive wheels of the vehicle 33 is a so-called automatic transmission (AT), the present invention is not limited thereto.

The drive robot R includes a plurality of actuators which operate devices required in order to cause the vehicle to travel such as the accelerator pedal, brake pedal, shift lever and ignition switch of the vehicle. Among the plurality of actuators equipped to the drive robot R, FIG. 1 illustrates an accelerator actuator R1 which operates the accelerator pedal, a brake actuator R2 which operates the brake pedal, and a shift actuator R3 which operates a shift lever.

The accelerator actuator R1, when an accelerator opening degree command signal is inputted from the robot control device 1, extends or retracts a rod (not illustrated) so that the accelerator pedal opening degree of the vehicle 33 becomes the opening degree according to the accelerator opening degree command signal.

The brake actuator R2, when a brake opening degree command signal is inputted from the robot control device 1, extends or retracts a rod (not illustrated) so that the brake pedal opening degree of the vehicle 33 becomes the opening degree according to the brake opening degree command signal.

The shift actuator R3, when a shift position command signal is inputted from the robot control device 1, extends or retracts a rod (not illustrated) so that the position of the shift lever of the vehicle 33 becomes the position according to the shift position command signal.

When the various pedals, shift lever, etc. are operated by the actuators such as the accelerator actuator R1, brake actuator R2 and shift actuator R3, the vehicle 33 generates drive power according to the operation amount of these pedals. The chassis dynamometer 4 performs control according to the running resistance computed by the running resistance force control device 5 according to the speed, etc. of the vehicle 33. The chassis dynamometer 4 is provided with an encoder 41 which detects the rotation speed of a roller contacted by the drive wheels of the vehicle 33, and sends a signal according to the detection signal to the running resistance force control device 5 and robot control device 1. Hereinafter, a case will be explained of detecting the speed of the vehicle 33 using the detection signal of this encoder 41; however, the present invention is not limited thereto. The speed of the vehicle 33 may be detected using a speed sensor equipped to this vehicle 33.

The running resistance force control device 5 computes the running resistance according to the speed, etc. of the vehicle 33 detected by the encoder 41. This running resistance force is a value imitating an external force which can act on the vehicle during actual travel such as the air resistance force, rolling resistance force, slope resistance force and inertia corresponding to vehicle weight. This running resistance force is set so as to increase as the speed of the vehicle increases, as schematically shown in FIG. 1, for example.

The robot control device 1 is a computer configured by a CPU, ROM, RAM, database, I/O interface, etc. The robot control device 1 functions as a play measurement device 2 and vehicle speed control device 6 explained below, by executing various computational processing in the CPU, in accordance with a program stored in the ROM.

The vehicle speed control device 6, when the vehicle speed command value which is time series data of vehicle speed is inputted, generates an accelerator opening degree command signal, brake opening degree command signal, shift position command signal, etc. based on a known speed control algorithm, so that the speed command values are realized at each time, in the vehicle 33 placed on the chassis dynamometer 4, and then inputs to the actuators R1, R2, R3 of the driver robot R.

Play is set in the accelerator pedal and brake pedal equipped to the vehicle 33. Therefore, with the speed control algorithm of the vehicle speed control device 6, it becomes possible to set the play opening degree of the accelerator pedal and play opening degree of the brake pedal unique to each vehicle, so as to be able to reliably change the speed of the vehicle 33 to the speed command value.

The play measurement device 2 measures the play opening degrees of the accelerator pedal and brake pedal of the vehicle 33, and sends the measured values of these play opening degrees to the speed control device 6. The vehicle speed control device 6 generates an accelerator opening degree command signal, brake opening degree command signal, shift position command signal, etc. using the measurement value of the play opening degree obtained by the play measurement device 2.

Figure 2:
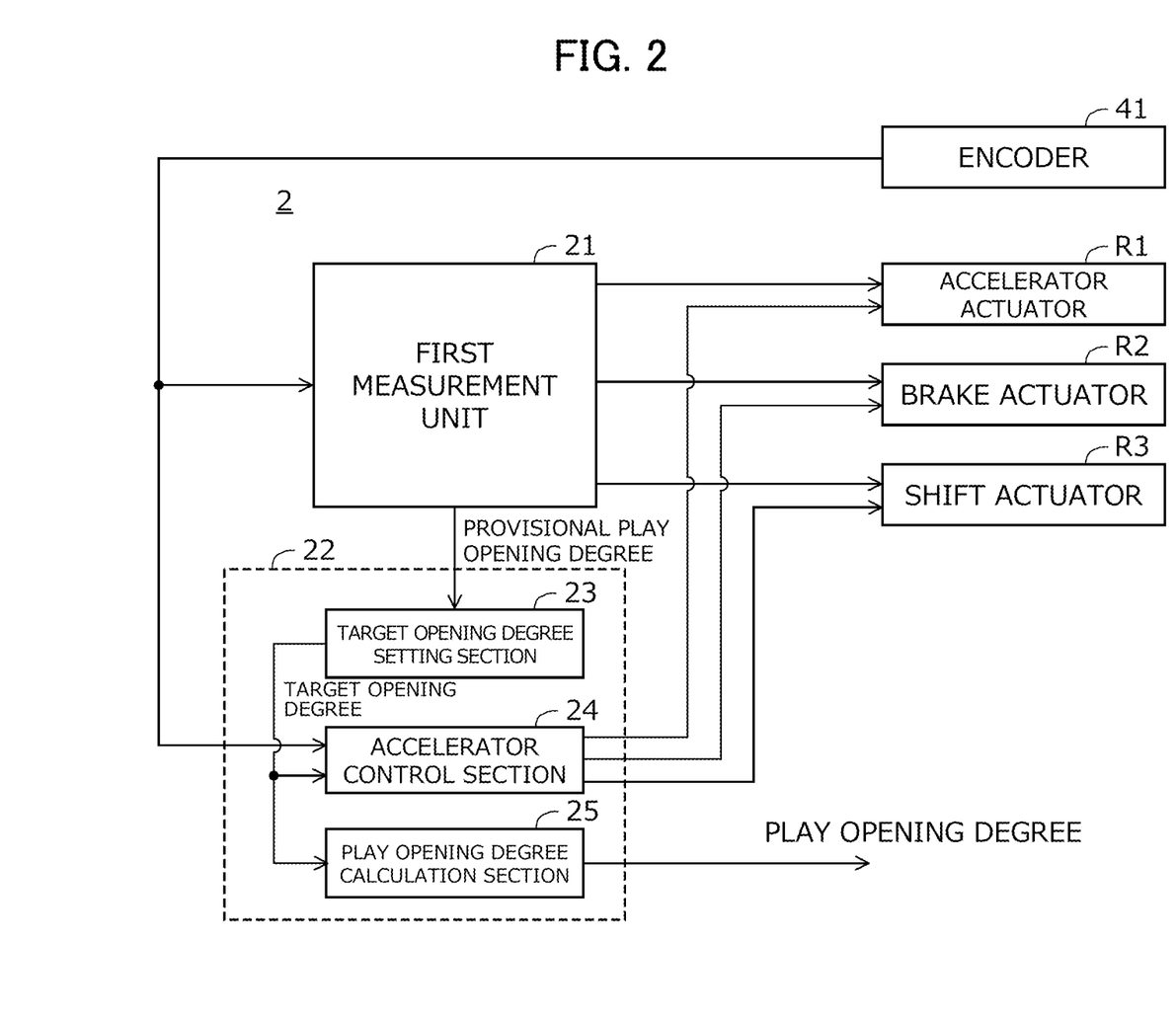
FIG. 2 is a functional block diagram showing the configuration of a play measurement device.

FIG. 2 is a functional block diagram showing the configuration of the play measurement device 2. FIG. 2 shows only a portion related to measurement of the play opening degree of the accelerator pedal of the vehicle 33, among the play measurement device 2.

The play measurement device 2 drives the accelerator actuator R1, brake actuator R2 and shift actuator R3, and measures the play opening degree of the accelerator pedal according to the change in the vehicle speed detection value obtained by the encoder 41 equipped to the chassis dynamometer 4, when driving this accelerator actuator R1, brake actuator R2 and shift actuator R3. More specifically, the play measurement device 2 includes a first measurement unit 21 which measures a provisional play opening degree corresponding to a provisional value relative to the play opening degree of the accelerator pedal, and a second measurement unit 22 which measures the playing opening degree more precisely using the provisional play opening degree obtained by the first measurement unit 21.

The first measurement unit 21 calculates a provisional play opening degree corresponding to a provisional value relative to the play opening degree, based on a change in the vehicle speed detection value at a time when increasing the accelerator pedal opening degree at a predetermined first speed from a full-closed opening degree (hereinafter full-closed opening degree defined as 0%, and full-open opening degree defined as 100%), by driving the accelerator actuator R1. More specifically, the first measurement unit 21 determines whether or not the vehicle speed detection value has increased while increasing the accelerator pedal opening degree at the first speed from the full-closed opening degree, by driving the accelerator actuator R1, and sets the provisional play opening degree based on the accelerator pedal opening degree at the time when determined that the vehicle speed detection value increased. Herein, accelerator pedal opening degree at the time when determined that the vehicle speed detection value increased by the first measurement unit 21 is considered to be close to the opening degree at which the power generation source of the vehicle 33 reacts to the operation of the accelerator pedal, i.e. true play opening degree. Therefore, the provisional play opening degree is set in the vicinity of the true opening degree at which the play of the accelerator pedal becomes 0. However, since delay exists in the response of the vehicle speed relative to the operation of the accelerator pedal in the aforementioned way, there exists a shift in the provisional play opening degree relative to the true play opening degree by an amount according to the error of the vehicle speed detection value and magnitude of the first speed.

The second measurement unit 22 calculates the play opening degree of the accelerator pedal based on the change in vehicle speed detection value at the time when the increasing the accelerator pedal opening degree at a second speed which is faster than the first speed from the full-closed opening degree to the vicinity of the provisional play opening degree, by driving the accelerator actuator R1. More specifically, the second measurement unit 22 includes a target opening degree setting section 23, accelerator control section 24, and play opening degree calculation section 25.

The accelerator control section 24 executes, for a plurality of times, acceleration control which increases, by driving the accelerator actuator R1, the accelerator pedal opening degree at the second speed which is set faster than the first speed towards the target opening degree set by the target opening degree setting section 23, and determines the existence of an increase in the vehicle speed detection value.

Based on the provisional play opening degree calculated by the first measurement unit 21, the target opening degree setting section 23 sets the target opening degree referenced in the accelerator control section 24 in the vicinity of this provisional play opening degree. The target opening degree setting unit 23 causes the target opening degree to change every time the accelerator control is executed by the accelerator control section 24. More specifically, the target opening degree setting section 23 causes the target opening degree to decrease or increase from the provisional play opening degree every time the accelerator control is executed.

The play opening degree calculation section 25 calculates the play opening degree based on the target opening degree at the time when an increase in the vehicle speed detection value was first no longer detected by the accelerator control section 24, or at the time when an increase in the vehicle speed detection value was first detected.

Next, the specific sequence of the play measurement method for measuring the play opening degree of the accelerator pedal by the above such play measurement device 2 will be explained while referencing FIGS. 3 and 4. FIGS. 3A and 3B are flowcharts showing the specific sequence of the play measurement method.

Figure 3A:
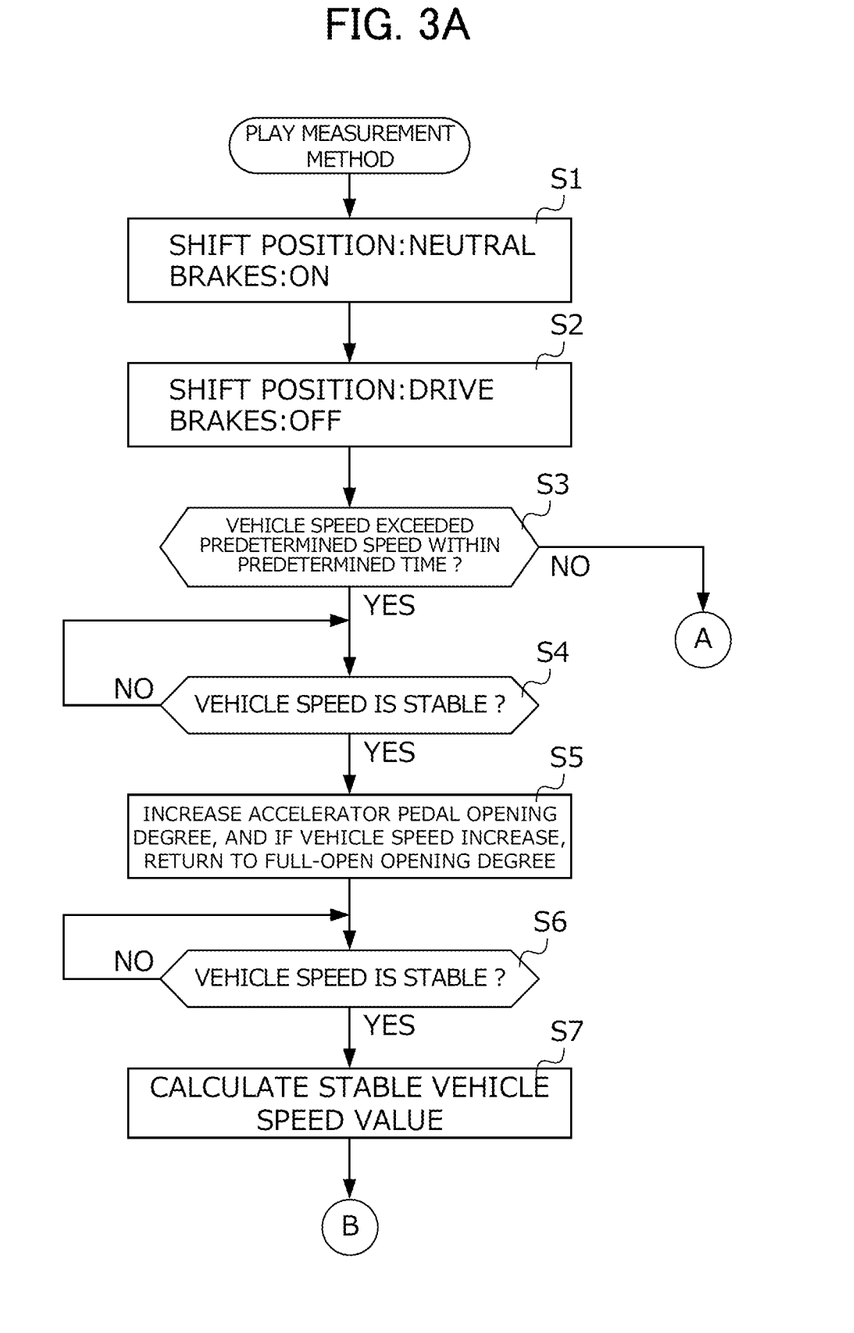
FIG. 3A is a flowchart showing the specific sequence of a play measurement method.
Figure 3B:
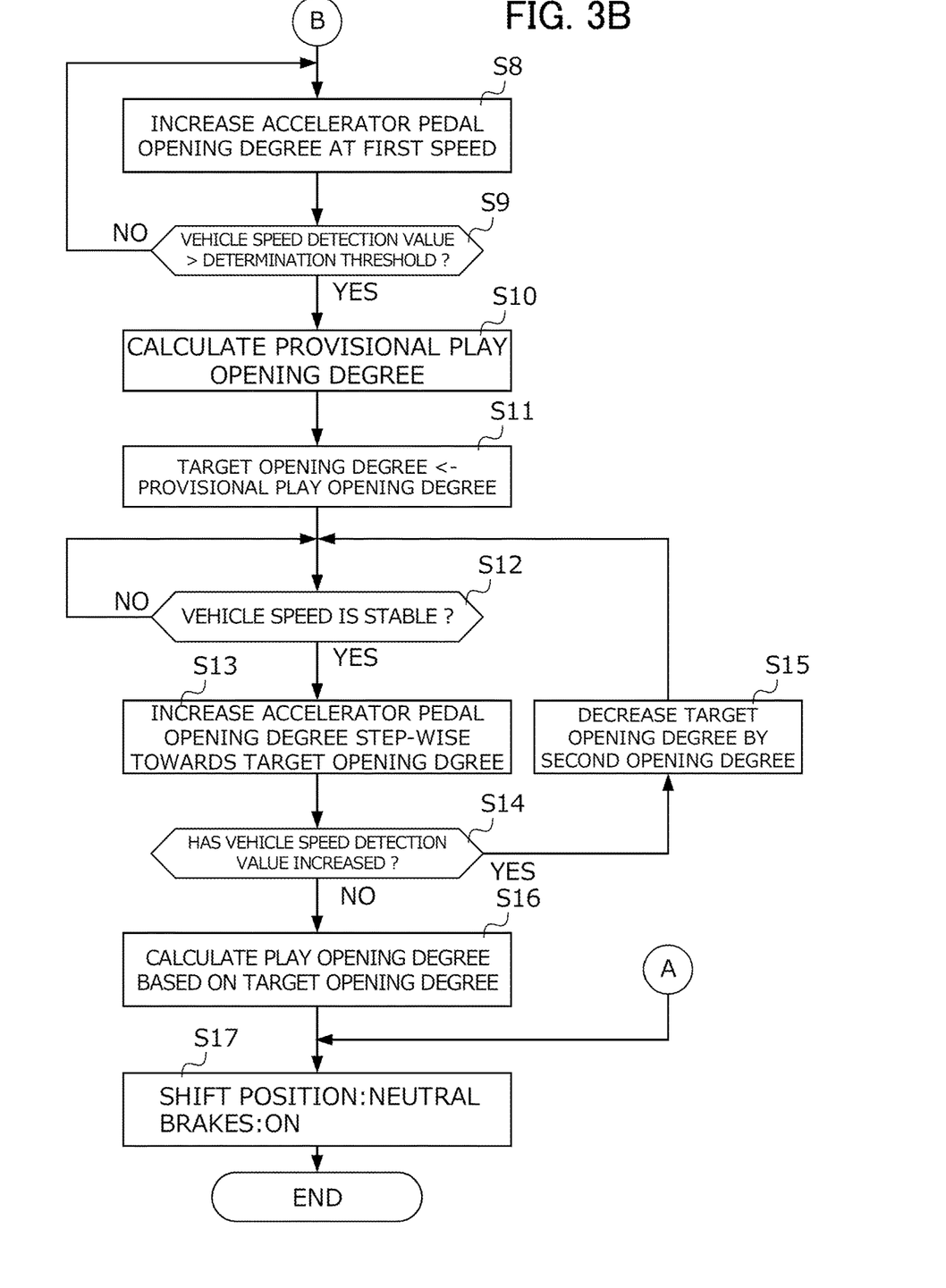
FIG. 3B is a flowchart showing the specific sequence of the play measurement method.

As shown in FIGS. 3A and 3B, the play measurement method is divided into a provisional play opening degree measurement step (Steps S1 to S10) in which the first measurement unit 21 calculates the provisional play opening degree; and a play opening degree measurement step (Steps S11 to S16) in which the second measurement unit 22 calculates the play opening degree of the accelerator pedal more precisely using the provisional play opening degree.

In Step S1, the first measurement unit 21 depresses the brake pedal to turn ON the brakes, in a state setting the shift position to neutral, by driving the brake actuator R2 and shift actuator R3.

In Step S2, the first measurement unit 21, after changing the shift position from neutral to drive by driving the shift actuator R3, releases the depression of the brake pedal by driving the brake actuator R2, and turns OFF the brakes.

In Step S3, the first measurement unit 21 measures whether or not the vehicle speed detection value has exceeded a predetermined value (for example, 0.2 km/h) within a predetermined time (for example, 10 seconds), since turning OFF the brakes in Step S2. In the case of the determination result of Step S3 being NO, the first measurement unit 21 advances to Step S17 described later on the occasion of any trouble arising, and ends the processing of FIGS. 3A and 3B. In the case of the determination result of Step S3 being YES, the first measurement unit 21 advances to Step S4.

In Step S4, the first measurement unit 21 determines whether or not the speed is stable. In the case of the determination result of Step S4 being NO, the first measurement unit 21 maintains the creeping state, and executes determination of Step S4 again after a predetermined time. In the case of the determination result of Step S4 being YES, the first measurement unit 21 advances to Step S5. It should be noted that whether or not the vehicle speed is stable can be determined in the following sequence, for example. The first measurement unit 21 calculates an average value for the vehicle speed calculation value (hereinafter referred to as unit segment average value) for every unit segment (for example, 1 second), and the average value for the vehicle speed detection value (hereinafter referred to as plural segment average value) for every plurality of segments (for example, 5 segments, i.e. 5 seconds); determines that the vehicle speed is stable in the case of an absolute value which is a value obtained by subtracting the unit segment average value from this plural segment average value being no more than a threshold which is slightly greater than 0 (for example, 0.02 km/h); and determines that the speed is not stable in the case of this absolute value being greater than the threshold.

In Step S5, the first measurement unit 21 causes the accelerator pedal opening degree to increase from full-closed opening degree at a predetermined speed, by driving the accelerator actuator R1, and returns the accelerator pedal opening degree to the full-closed opening degree if the vehicle speed detection value increased until exceeding the predetermined value. The state of the vehicle immediately after startup is unstable. For this reason, if executing the processing of Steps S7 to S10 described later in order to calculate the provisional play opening degree immediately after changing the shift position to the drive position in Step S2, the calculation result of the provisional play opening degree may change each time. Therefore, in the present embodiment, after changing the shift position to the drive position in Step degree S2, by causing the opening of the accelerator pedal to tentatively change until the vehicle speed detection value increases in this way, since it is possible to stabilize the state of the vehicle prior to starting the processing of Steps S7 to S10 described later in order to calculate the provisional play opening degree, it is possible to precisely calculate the provisional play opening degree.

In Step S6, the first measurement unit 21 determines whether the vehicle speed is stable by the same sequence as Step S4. In the case of the determination result of Step S6 being NO, the first measurement unit 21 maintains the creeping state, and executes determination of Step S6 again after a predetermined time. In the case of the determination result of Step S6 being YES, the first measurement unit 21 advances to Step S7.

In Step S7, the first measurement unit 21 calculates a stable vehicle speed value. This stable vehicle speed value corresponds to the vehicle speed at the time when setting the accelerator pedal opening degree to full-closed opening degree. More specifically, the first measurement unit 21 calculates the stable speed value by using the above-mentioned unit segment average value, plural segment average value, etc., for example.

In Step S8, the first measurement unit 21 causes the accelerator pedal opening degree to increase from full-closed opening degree at a first speed set in advance, by driving the accelerator actuator R1. In Step S9, the first measurement unit 21 determines whether or not the vehicle speed detection value has exceeded a predetermined determination threshold. Herein, determination threshold is a threshold to be used in order to determine whether or not the power generation source of the vehicle 33 reacted to operation of the accelerator pedal, and is set to a value obtained by adding a threshold slightly larger than 0 (for example, 0.2 km/h) to the stable speed value calculated in Step S7, for example. In the case of the determination result of Step S9 being NO, the first measurement unit 21 returns to Step S8, and continues increasing the accelerator pedal opening degree at the first speed until the vehicle speed detection value exceeds the vehicle stable speed value.

In the case of the determination result of Step S9 being YES, the first measurement unit 21 calculates the provisional play opening degree (refer to Step S10). More specifically, the first measurement unit 21 acquires the accelerator pedal opening degree at the time when determined that the vehicle speed detection value exceeded the determination threshold, and sets the opening degree obtained by adding a positive first opening degree (for example +0.5%) to the acquired accelerator pedal opening degree as the provisional play opening degree. The provisional play opening degree is thereby set to an opening degree larger than the true play opening degree.

In Step S11, the target opening degree setting section 23 of the second measurement section 22 sets the target opening degree using the provisional play opening degree calculated by the first measurement unit 21. More specifically, the target opening degree setting section 23 sets the provisional play opening degree as the target opening degree.

In Step S12, the accelerator control section 24 of the second measurement unit 22 determines whether the vehicle speed is stable by the same sequence as Step S4. In the case of the determination result of Step S12 being NO, the accelerator control section 24 maintains the creeping state, and executes determination of Step S12 again after a predetermined time. In the case of the determination result of Step S12 being YES, the accelerator control section 24 advances to Step S13.

In Step S13, the accelerator control section 24 of the second measurement unit 22 starts accelerator control. More specifically, the accelerator control section 24 increases the accelerator pedal opening degree by driving the accelerator actuator R1 at a second speed which is faster than the first speed towards the target opening degree set by the target opening degree setting section 23, and after maintaining a state in which the accelerator pedal opening degree is the target opening degree for a predetermined time, starts accelerator control to return the accelerator pedal opening degree to the full-closed opening degree. It should be noted that, in this accelerator control, the accelerator control section 24 preferably increases the accelerator pedal opening degree towards the target opening degree at the second speed which is faster than the first speed, by changing the accelerator pedal opening degree step-wise (refer to FIG. 4 described later).

In Step S14, the accelerator control section 24 determines whether or not the vehicle speed detection value has increased. More specifically, the accelerator control section 24 calculates the unit segment average value after increasing the accelerator pedal opening degree towards the target opening degree in Step S13, and determines whether this unit segment average value has exceeded the determination threshold, in the case of the unit segment average value being greater than the determination threshold, determines that the vehicle speed detection value has increased, and in the case of the unit segment average value being no more than the determination threshold, determines that the vehicle speed detection value has not increased. Herein, the determination threshold is set to a value obtained by adding a threshold slightly larger than 0 (for example, 0.2 km/h) to the stable vehicle speed value calculated in Step S7, for example. It should be noted that FIG. 4 shows a case of the vehicle speed detection value increasing, when executing the accelerator control with the provisional play opening degree as the target opening degree.

In the case of the determination result of Step S14 being YES, i.e. case of being determined that the vehicle speed detection value increased, the target opening degree setting section 23 advances to Step S12 after decreasing the target opening degree by a predetermined second opening degree (refer to Step S15). It should be noted that, in order to more precisely measure the play opening degree than the provisional play opening degree by executing accelerator control of the accelerator control section 24 a plurality of times, it is preferable for the second opening degree to be smaller than the aforementioned first opening degree. More specifically, in the case of setting the first opening degree as 0.5%, the second opening degree is 0.3%, for example. The accelerator control section 24, after determining whether the vehicle speed is stable (refer to Step S12), in the case of being stable, executes accelerator control again under the newly set target opening degree (refer to Step S13).

In the case of the determination result of Step S14 being NO, i.e. case of being determined that the vehicle speed detection value has not increased, the play opening degree calculation section 25 of the second measurement unit 22 calculates the play opening degree based on the target opening degree for this time (refer to Step S16). More specifically, the play opening degree calculation section 25 calculates the target opening degree for the time when an increase in the vehicle speed detection value was first detected as the play opening degree, for example; however, the present invention is not limited thereto. The play opening degree calculation section 25 may calculate an opening degree between the target opening degree at the time when an increase in vehicle speed detection value was first detected, and the opening degree obtained by adding the second opening degree to this target opening degree, as the play opening degree.

In Step S17, the play opening degree calculation section 25, after depressing the brake pedal by driving the brake actuator R2 to turn ON the brakes, changes the shift position from drive to neutral by driving the shift actuator R3, and ends the processing of FIGS. 3A and 3B.

Figure 4:
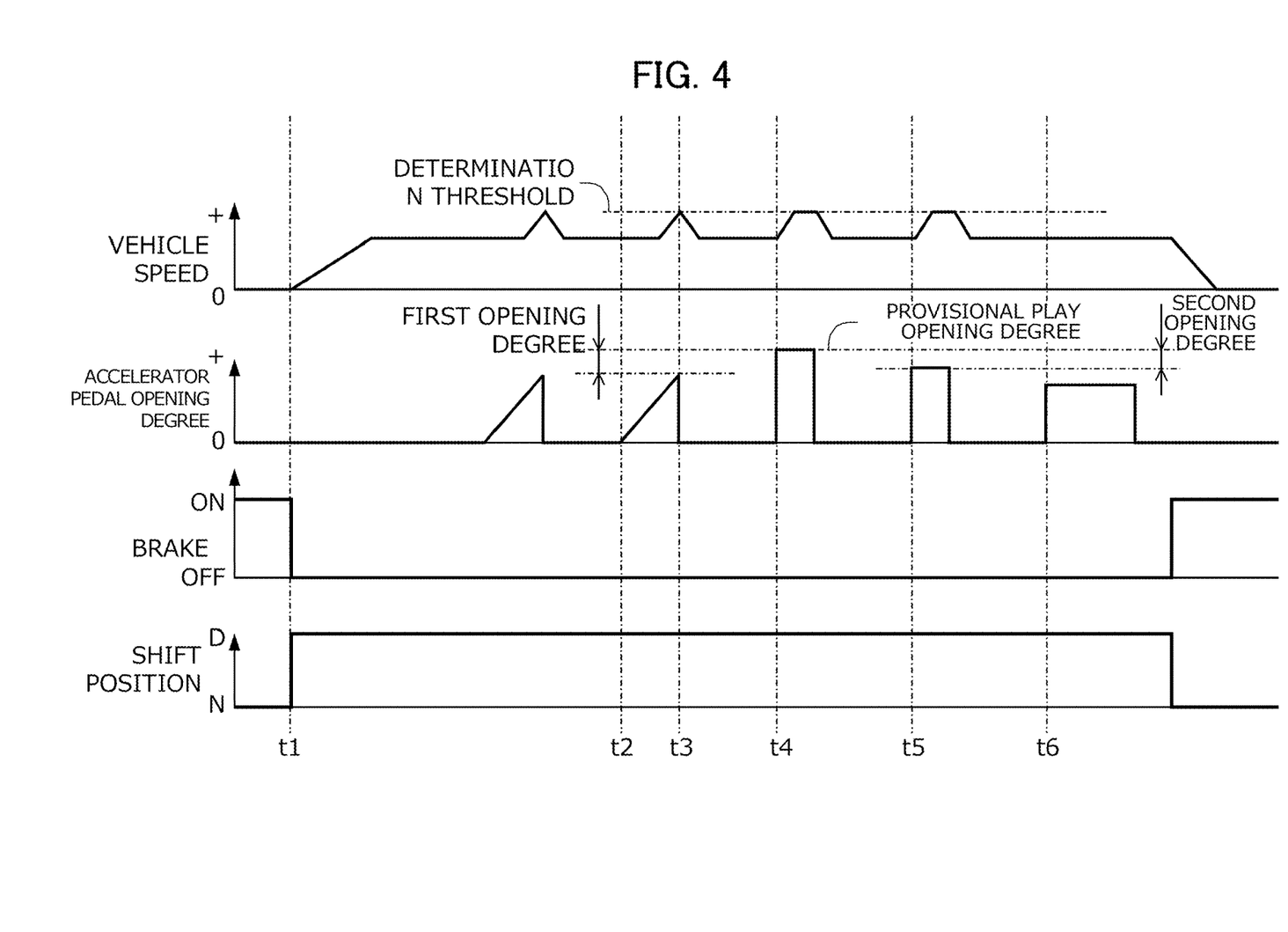
FIG. 4 is a time chart showing the changes in vehicle speed, accelerator pedal opening degree, ON/OFF of brake pedal and shift position realized according to the play measurement method of FIGS. 3A and 3B.

FIG. 4 is a time chart showing the changes in the vehicle speed detection value (km/h), accelerator pedal opening degree (%), ON/OFF of brake pedal, and shift position realized by the play measurement method of FIGS. 3A and 3B.

At time t1, the first measurement unit 21 changes the shift position from neutral to drive, and turns OFF the brakes (refer to Step S2). The vehicle thereby enters the creeping state, and the vehicle speed detection value starts to increase.

Subsequently, at time t2, the first measurement unit 21 causes the accelerator pedal opening degree to increase from the full-closed opening degree at the first speed, in response to determining that the vehicle speed is stable (refer to Steps S6 to S8). At time t3, in response to determining that the vehicle speed detection value exceeded the determination threshold set in advance, the first measurement unit 21 calculates an opening degree obtained by adding the first opening degree to the accelerator pedal opening degree for this time as the provisional play opening degree (refer to Steps S9 to S10).

At time t4 and later, the second measurement unit 22 executes over a plurality of times the accelerator control of causing the accelerator pedal opening degree to change from the full-closed opening degree to the target opening degree step-wise, and determining the existence of an increase in vehicle speed detection value (refer to Steps S11 to S15). FIG. 4 shows a case of executing the accelerator control at time t4, time t5 and time t6. In addition, at this time, the second measurement unit 22 sets the provisional play opening degree as the target opening degree in accelerator control of time t4, sets an opening degree decreased by the second opening from the provisional play opening degree in the accelerator control of time t5 as the target opening degree, and sets an opening degree further decreased by the second opening degree in the accelerator control of time t6 as the target opening.

In this way, the second measurement unit 22 executes the accelerator control over a plurality of times while decreasing the target opening degree by the second opening degree from the provisional play opening degree, and calculates the play opening degree based on the target opening degree (provisional play opening degree−second opening degree×2) at time t6 at which the increase in vehicle speed detection value was first detected (refer to Step S16).

It should be noted that the flowcharts of FIGS. 3A and 3B explain a case of the second measurement unit 22 executing the accelerator control a plurality of times while decreasing the target opening degree from the provisional play opening degree, and calculating the play opening degree based on the target opening degree for the time when an increase in the vehicle speed detection value was first no longer detected; however, the present invention is not limited thereto. The second measurement unit 22 may execute the accelerator control a plurality of times while increasing the target opening degree from the provisional play opening degree, and calculate the play opening degree based on the target opening degree for the time when the increase in the vehicle speed detection value was first detected. In this case, the first measurement unit 21 preferably sets an opening degree obtained by subtracting the first opening degree from the accelerator pedal opening degree for the time at which the vehicle speed detection value exceeded the determination threshold, as the provisional play opening degree.

Although an embodiment of the present invention has been explained above, the present invention is not limited thereto. The configuration of detailed parts may be modified as appropriate within the scope of the gist of the present invention.

For example, in the above-mentioned embodiment, a case is explained of measuring the play opening degree of the accelerator pedal of the vehicle 33 in which the transmission is an automatic transmission; however, the present invention is not to be limited thereto. The transmission equipped to the vehicle may be a continuously variable transmission (CVT) or manual transmission (MT), in addition to an automatic transmission. However, in the case of the transmission being a manual transmission, it mainly differs in the point of requiring to use a robot equipped with a clutch actuator to operate the clutch of the vehicle as the drive robot, and the sequence of processing of Step S2 in FIG. 3A. In other words, in the case of the transmission being a manual transmission, in Step S2, the first measurement unit 21 first depresses the clutch pedal by driving the clutch actuator, then releases the depression of the brake pedal by driving the brake actuator and changes the shift position from neutral to first gear by driving the shift actuator to realize a half clutch state while gradually releasing the depression of the clutch pedal, and then completely releases depression of the clutch pedal. Other sequences are basically the same as the sequence shown in FIGS. 3A and 3B.

EXPLANATION OF REFERENCE NUMERALS

S vehicle testing system
1 robot control device
2 play measurement device (accelerator play measurement device)
21 first measurement unit
22 second measurement unit
23 target opening degree setting section
24 accelerator control section
25 play opening degree calculation section
3 control target
R drive robot
R1 accelerator actuator
R2 brake actuator
R3 shift actuator
33 vehicle
4 chassis dynamometer
41 encoder (vehicle speed sensor)

The invention claimed is:

1. An accelerator play measurement device for measuring a play opening degree of an accelerator pedal of a vehicle, the accelerator play measurement device comprising:
   an accelerator actuator which operates the accelerator pedal;
   a vehicle speed sensor which detects vehicle speed of the vehicle;
   a first measurement unit which calculates a provisional play opening degree based on a change in a vehicle speed detection value from the vehicle speed sensor at a time when increasing the accelerator pedal opening degree at a first speed from a full-closed opening degree by way of driving the accelerator actuator; and
   a second measurement unit which calculates the play opening degree based on a change in the vehicle speed detection value at a time when increasing the accelerator pedal opening degree at a second speed which is faster than the first speed to a vicinity of the provisional play opening degree, by way of driving the accelerator actuator.

2. The accelerator play measurement device according to claim 1, further comprising a shift actuator which operates a shift lever of the vehicle,
   wherein the first measurement unit sets a position of the shift lever to a drive position by driving the shift actuator, and after the vehicle speed detection value becomes stable, starts driving of the accelerator actuator.

3. The accelerator play measurement device according to claim 2,
   wherein the first measurement unit:
   causes the accelerator pedal opening degree to increase from a full-closed opening degree by driving the accelerator actuator, after setting the position of the shift lever to the drive position, and if the vehicle speed detection value increases, returns the accelerator pedal opening degree to the full-closed opening degree, and subsequently calculates the provisional play opening degree by driving the accelerator actuator, after the vehicle speed detection value becomes stable.

4. An accelerator play measurement method executed by the accelerator play measurement device according to claim 1, the method comprising:
a provisional play opening degree measurement step of the first measurement unit calculating a provisional play opening degree based on a change in the vehicle speed detection value from the vehicle speed sensor at a time when increasing the accelerator pedal opening degree at a first speed from a full-closed opening degree, by way of driving the accelerator actuator; and
a play opening degree measurement step of the second measurement unit calculating the play opening degree based on a change in the vehicle speed detection value at a time when increasing the accelerator pedal opening degree at a second speed which is faster than the first speed towards a vicinity of the provisional play opening degree, by way of driving the accelerator actuator.

5. A program for causing a computer to execute each step of the accelerator play measurement method according to claim 4.

6. A medium encoded with the program according to claim 5.

7. The accelerator play measurement device according to claim 1, wherein the first measurement unit determines whether the vehicle speed detection value has increased while increasing the accelerator pedal opening degree at the first speed from a full-closed opening degree, and calculates the provisional play opening degree based on the accelerator pedal opening degree of a time when determined that the vehicle speed detection value increased; and
wherein the second measurement unit includes:
an accelerator control section which executes, for a plurality of times, accelerator control to cause the accelerator pedal opening degree to increase at the second speed towards a predetermined target opening degree by driving the accelerator actuator, and determine existence of an increase in the vehicle speed detection value, while degreasing or increasing the target opening degree from the provisional play opening degree; and
a play opening degree calculation section which calculates the play opening degree based on the target opening degree at a time when an increase in the vehicle speed detection value first was no longer detected, or at a time when an increase in the vehicle speed detection value was first detected, by the accelerator control unit.

8. The accelerator play measurement device according to claim 7, wherein the first measurement unit calculates, as the provisional play opening degree, an opening degree which is larger by a predetermined opening degree than the accelerator pedal opening degree of a time when determined that the vehicle speed detection value increased;
wherein the accelerator control unit executes the accelerator control for a plurality of times while decreasing the target opening degree from the provisional play opening degree; and
wherein the play opening degree calculation section calculates the play opening degree based on the target opening degree of a time when an increase in the vehicle speed detection value was first no longer detected by the accelerator control unit.

9. The accelerator play measurement device according to claim 8, wherein the accelerator control unit causes the accelerator pedal opening degree to increase towards the target opening degree at the second speed which is faster than the first speed by causing the accelerator pedal opening degree to change step-wise in the accelerator control.

10. The accelerator play measurement device according to claim 9, further comprising a shift actuator which operates a shift lever of the vehicle,
wherein the first measurement unit sets a position of the shift lever to a drive position by driving the shift actuator, and after the vehicle speed detection value becomes stable, starts driving of the accelerator actuator.

11. The accelerator play measurement device according to claim 8, further comprising a shift actuator which operates a shift lever of the vehicle,
wherein the first measurement unit sets a position of the shift lever to a drive position by driving the shift actuator, and after the vehicle speed detection value becomes stable, starts driving of the accelerator actuator.

12. The accelerator play measurement device according to claim 11,
wherein the first measurement unit:
causes the accelerator pedal opening degree to increase from a full-closed opening degree by driving the accelerator actuator, after setting the position of the shift lever to the drive position, and if the vehicle speed detection value increases, returns the accelerator pedal opening degree to the full-closed opening degree, and
subsequently calculates the provisional play opening degree by driving the accelerator actuator, after the vehicle speed detection value becomes stable.

13. The accelerator play measurement device according to claim 7, wherein the first measurement unit calculates, as the provisional play opening degree, an opening degree which is smaller by a predetermined opening degree than the accelerator pedal opening degree of a time when determined that the vehicle speed detection value increased;
wherein the accelerator control unit executes the accelerator control for a plurality of times while increasing the target opening degree from the provisional play opening degree; and
wherein the play opening degree calculation section calculates the play opening degree based on the target opening degree of a time when an increase in the vehicle speed detection value was first detected by the accelerator control unit.

14. The accelerator play measurement device according to claim 13, further comprising a shift actuator which operates a shift lever of the vehicle,
wherein the first measurement unit sets a position of the shift lever to a drive position by driving the shift actuator, and after the vehicle speed detection value becomes stable, starts driving of the accelerator actuator.

15. The accelerator play measurement device according claim 13, wherein the accelerator control unit causes the accelerator pedal opening degree to increase towards the target opening degree at the second speed which is faster than the first speed by causing the accelerator pedal opening degree to change step-wise in the accelerator control.

16. The accelerator play measurement device according to claim 15, further comprising a shift actuator which operates a shift lever of the vehicle,
wherein the first measurement unit sets a position of the shift lever to a drive position by driving the shift actuator, and after the vehicle speed detection value becomes stable, starts driving of the accelerator actuator.

17. The accelerator play measurement device according to claim 7, wherein the accelerator control unit causes the accelerator pedal opening degree to increase towards the target opening degree at the second speed which is faster than the first speed by causing the accelerator pedal opening degree to change step-wise in the accelerator control.

18. The accelerator play measurement device according to claim 17, further comprising a shift actuator which operates a shift lever of the vehicle, wherein the first measurement unit sets a position of the shift lever to a drive position by driving the shift actuator, and after the vehicle speed detection value becomes stable, starts driving of the accelerator actuator.

19. The accelerator play measurement device according to claim 7, further comprising a shift actuator which operates a shift lever of the vehicle, wherein the first measurement unit sets a position of the shift lever to a drive position by driving the shift actuator, and after the vehicle speed detection value becomes stable, starts driving of the accelerator actuator.

20. The accelerator play measurement device according to claim 19, wherein the first measurement unit:

causes the accelerator pedal opening degree to increase from a full-closed opening degree by driving the accelerator actuator, after setting the position of the shift lever to the drive position, and if the vehicle speed detection value increases, returns the accelerator pedal opening degree to the full-closed opening degree, and subsequently calculates the provisional play opening degree by driving the accelerator actuator, after the vehicle speed detection value becomes stable.

* * * * *